April 30, 1935.    D. G. MERRILL    1,999,774
SPEED REGULATING MECHANISM
Filed Oct. 24, 1931    2 Sheets-Sheet 1
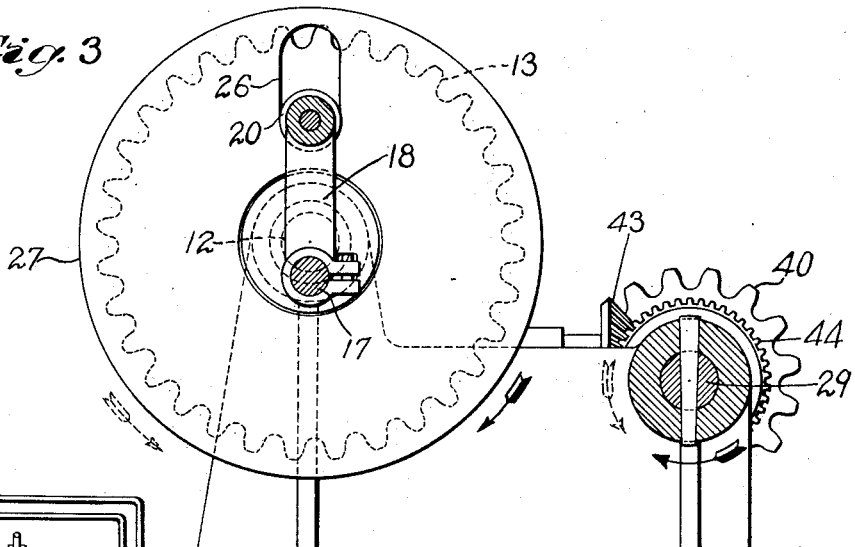
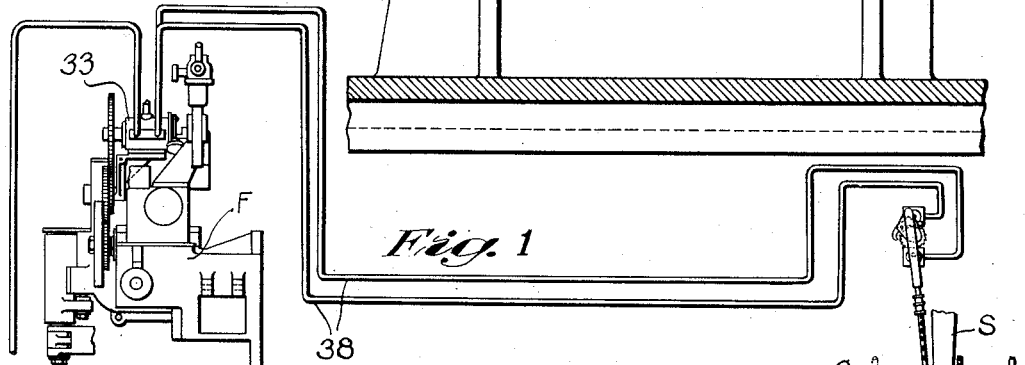
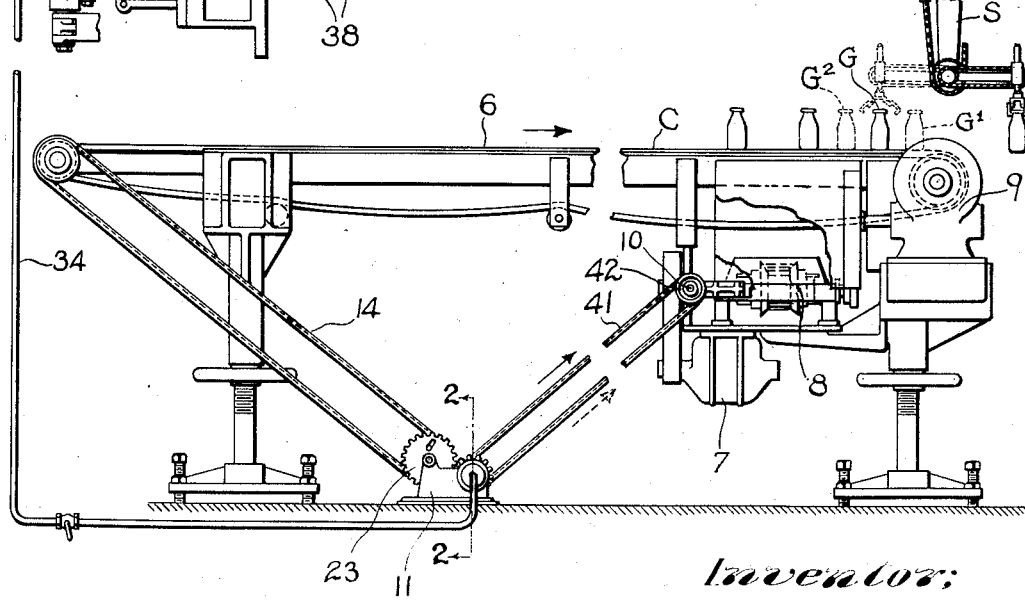

April 30, 1935.  D. G. MERRILL  1,999,774
SPEED REGULATING MECHANISM
Filed Oct. 24, 1931  2 Sheets-Sheet 2

Witness:
W. B. Thayer.

Inventor:
Donald G. Merrill
by Brown & Parham
Attorneys

Patented Apr. 30, 1935

1,999,774

UNITED STATES PATENT OFFICE 1,999,774

SPEED REGULATING MECHANISM

Donald G. Merrill, Hartford, Conn., assignor to Hartford-Empire Company, Hartford, Conn., a corporation of Delaware Application October 24, 1931, Serial No. 570,960

6 Claims. (Cl. 74—395)

This invention relates to automatic mechanism for regulating the speed of operation of one machine in accordance with the speed of operation of another machine, or with changes in the relative speeds of both of them, and in such a way as to maintain a time relation of operation between said machines.

Various devices have been proposed heretofore, intended to accomplish the purpose or purposes of the mechanism of this invention. However, such devices have been unsatisfactory because of their tendency to hunt, and/or their slowness in responding to changes in the relative speeds of the machines, that is, they have had a "minimum error" of operation.

It is an object of this invention to provide a novel automatic mechanism which will operate efficiently to regulate the operation of one machine according to that of another, or according to changes in the relative operating conditions of both of them, and which responds instantaneously to any disturbance of the desired relative speeds and/or relative times of operation, without a "minimum error".

Another object of the invention is to provide a novel device of the above character in which the tendency to hunt is greatly minimized or eliminated, so that if the relative operating conditions between the two machines are disturbed, such conditions will be restored and maintained.

Other objects of the invention will be pointed out in the following detailed description, or will become apparent as the description is proceeded with.

In order that the invention may be readily understood, reference should be had to the accompanying drawings, in which a convenient embodiment thereof is illustrated.

Figure 4:
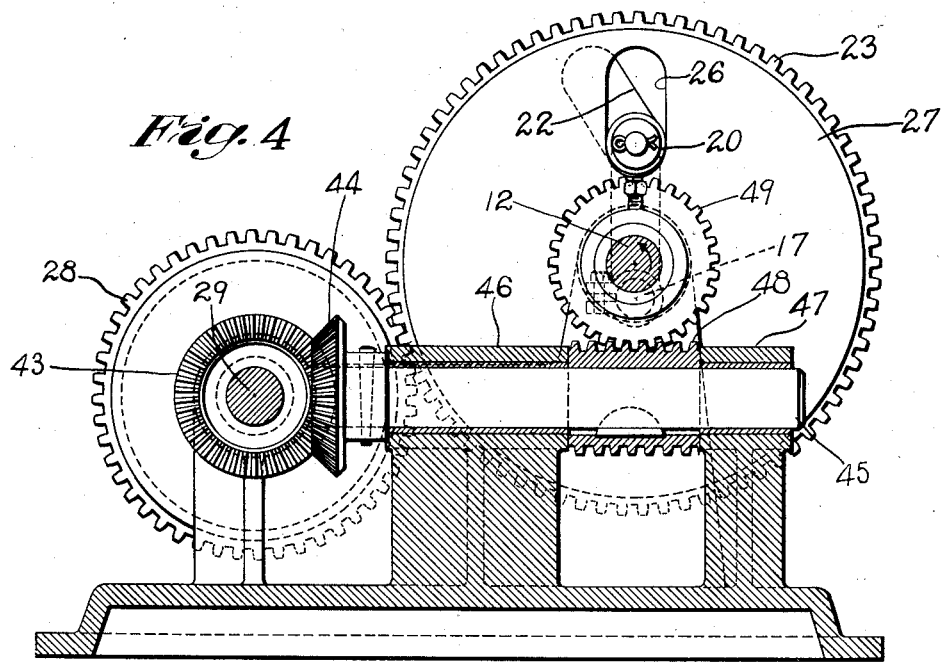
Figure 2:
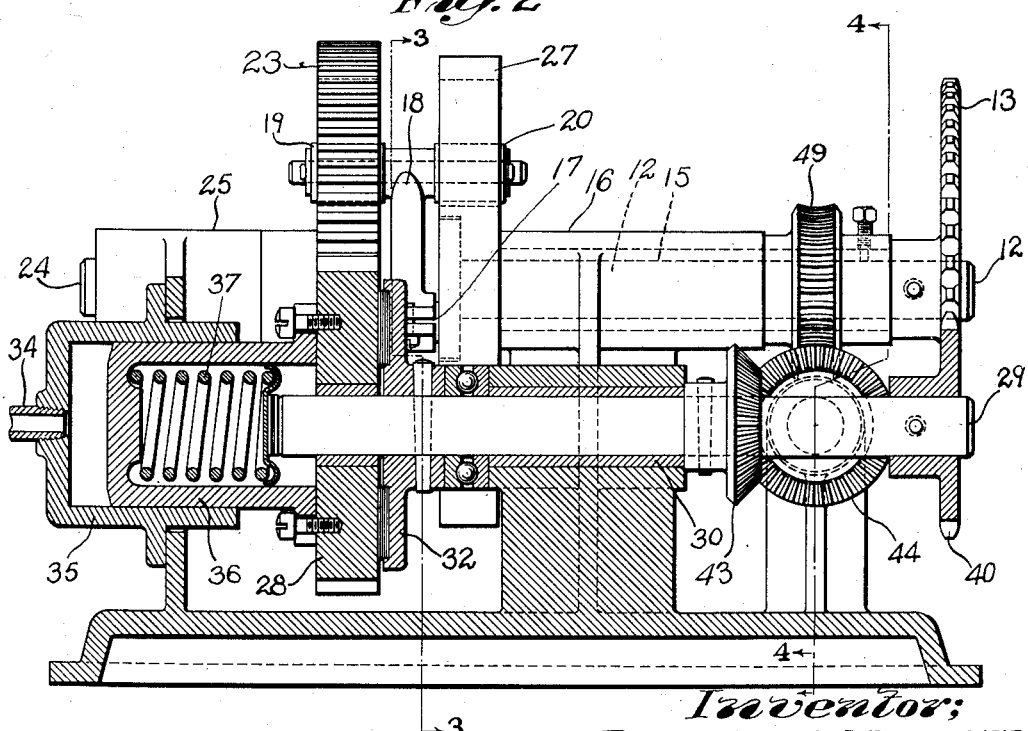

In said drawings:

Figure 1 is a view in side elevation illustrating the employment of mechanism embodying the invention for regulating the speed of operation of a conveyor in accordance with that of a glass feeder and an automatic stacker associated with said conveyor;

Fig. 2 is an enlarged view in vertical sectional elevation taken on the line 2—2 of Fig. 1; and Figs. 3 and 4 are transverse sectional views taken on the lines 3—3 and 4—4 of Fig. 2.

In the manufacture of glassware, charges of glass may be supplied by a feeder F in regular time intervals to the molds of a forming machine (not shown) operated in synchronism with the feeder. The finished glassware may be discharged from the forming machine at regular time intervals onto a continuous conveyor C, which glassware is picked up at regular time intervals by a stacker S. The stacker arranges the glassware as desired on the belt of a lehr (not shown) and ordinarily its operation is timed by the feeder.

The feeder F and stacker S do not per se form parts of the invention and may be of suitable construction.

As will be obvious, it is desirable that the articles of glassware successively arrive at the same point, as shown at G, where they may be removed by stacker S, at regular time intervals. But in order for this condition to obtain, the conveyor must be appropriately operated in accordance with the operation of the feeder and of the forming machine and stacker operated in synchronism therewith. Otherwise the articles will advance too far, as indicated at G', if the conveyor runs too fast, or not far enough, as indicated at G², if the conveyor runs too slowly. The invention is particularly concerned with novel mechanism which acts automatically to accomplish such desired operation.

The conveyor C is of usual construction comprising a continuously traveling belt 6, which is moved in the direction indicated by the arrow thereabove, by a motor 7. The motor operates variable speed drive 8 which in turn is connected to gearing in housing 9 which drives the belt 6.

The variable speed drive may be of the well known Reeves type as shown for example in Patent No. 1,546,996 July 21, 1925, but instead of being provided with the usual manually operable adjusting handle, has gearing connected thereto (not shown) which is turned one way or the other by the rotation of shaft 10 forming part of the gearing to cause adjustments of drive 8.

Such adjustments are effected by the novel regulator of the invention indicated at 11.

As shown in Figs. 2 and 3, the regulator 11 includes rotary shaft 12 which carries large sprocket wheel 13 on its outer end, constantly driven by chain 14, in turn driven by conveyor C. The rotation of shaft 12 and wheel 13 is always clockwise, as is apparent from Figs. 1 and 3.

Shaft 12 rotates freely in sleeve 15, the purpose of which is explained later, journaled in bearing 16.

On its inner end shaft 12 carries a crank 17, which by its clockwise rotation (Fig. 3) reciprocates connecting rod 18 pivotally connected thereto at its inner end. Said rod is bifurcated at its outer end for the provision of studs carrying rollers 19 and 20 (Fig. 2).

Roller 19 reciprocates in angular slot 22 of large gear 23, shaft 24 of which is journaled in bearing 25. Roller 20 reciprocates in radial slot 26 of disc 27 mounted on the inner end of sleeve 15, previously mentioned.

The angular arrangement of slot 22 to slot 26 causes gear 23 to be oscillated at all times through the same angle.

Gear 23 meshes at all times with a smaller spur gear 28 slidably mounted on shaft 29 journaled in bearing 30 (Fig. 2). Oscillations of gear 28 by gear 23 are communicated to shaft 29 at times determined by the intermittent engagement of a clutch, one plate of which is the gear 28, and the other friction plate of which is indicated at 32, and which is fast on shaft 29.

The intermittent engagement of the clutch is effected in timed relation to the operation of feeder F which, as is common, is provided with air puff supply means 33 from which leads conduit 34 connected to cylinder 35. Said cylinder contains hollow piston 36 secured to the outer face of gear 28, so that puffs of air from the feeder intermittently engage the clutch members. Said members are disengaged between puffs by compression spring 37 in piston 36, and which bears against a plate on shaft 29.

Conduits 38 may lead from valve 33 to stacker S to time the latter from the feeder.

Shaft 29, which may be termed the adjusting shaft, carries a small sprocket wheel 40 which is connected by chain 41 to sprocket wheel 42 on shaft 10 of the variable speed drive 8.

Disc 27 is turned very gradually when shaft 29 is adjusted one way or the other to change the angular position of slot 26 in the disc. This is accomplished by bevel gear 43 on shaft 29, which meshes with a similar bevel gear 44 on worm shaft 45. The shaft 45, which is journaled in bearings 46 and 47, carries left-hand worm 48, meshing with worm gear 49 on sleeve 15. The ratio of worm 48 to gear 49 preferably is high, say 20 to 1.

By means of the connections between shaft 29 and sleeve 15, disc 27 is slightly rotated in the same direction as shaft 29 to shift slot 26 and change the dead center position of crank 17 and rod 18. The purpose of this is explained in detail hereinafter.

The operation of the above-described mechanism may be as follows:

When the conveyor C is running at the correct speed for the feeder, former and stacker, and the device 11 operates in correct phase with feeder and stacker, articles of glassware successively arrive at position G, which is the desired point at which the articles are removed by the stacker.

Under these conditions, crank 17 and rod 18 successively arrive in diametrical alignment with slot 26 of disc 27, or dead center position, at regular time intervals, as illustrated in Fig. 3. At this time, crank 17 and rod 18 may be in their innermost positions, as shown, at the middle of the period in which a puff of air is supplied to cylinder 35 and hence during the middle of the period that the clutch is held engaged, hereinafter referred to as time T.

It is preferred that the coextensive puff and clutch engagement period be less than the time required for crank 17 to make a complete revolution and less than time for both an instroke and outstroke of rod 18.

From the above, it will be apparent that the clutch is engaged during equal instrokes and outstrokes of roller 19, which turns gear 23 first clockwise on the instroke (Fig. 1), then counterclockwise on the outstroke, through equal angles, or as seen in Fig. 4 counterclockwise on the instroke and clockwise on the outstroke.

This imparts equal turns to shaft 29 first counterclockwise (Figs. 1 and 3) then clockwise respectively and clockwise and counterclockwise respectively as seen in Fig. 4, because the clutch is engaged on equal instrokes and outstrokes of crank 17, as before stated.

Such turning of shaft 29 may merely serve to take up slack purposely provided in chain 41 so as not to move shaft 10 of variable speed regulator 8, although if chain 41 is taut, the turning of shaft 10 will have no appreciable effect on the setting of the variable speed regulator.

Such being the normal operation of the parts of the mechanism, the device 11 may be said to be stabilized since it is operating in phase with feeder and stacker. Therefore, the speed of the conveyor is maintained constant, no adjustments thereof being effected because of such stabilization of the device 11.

It will be observed that if the clutch is engaged on more of the outstroke of crank 17 and less of the instroke thereof, shaft 29 will be rotated step-by-step more in a clockwise direction (Fig. 3) than in a counterclockwise direction and vice versa. This drives chain 41 in the direction indicated by the solid arrow thereabove to change the setting of regulator 8, slowing down the conveyor, or in the opposite direction as indicated by the dashed arrow to speed up the conveyor, (see Fig. 1).

The directions in which shaft 29 and disc 27 are turned are similarly designated in Fig. 3, it being noted that disc 27 turns very slightly in response to an appreciable turn of shaft 29, and that said shaft and disc rotate in the same directions. However, the cumulative effect of a number of turns of shaft 29 turns disc 27 to different positions for purposes hereinafter explained.

The clutch is engaged on more of the outstroke and less of the instroke when the conveyor is running relatively too fast, because then the puffs lag behind crank 17 which is driven by the conveyor. This condition is reversed when the conveyor is running relatively too slow.

A complete series of operations for effecting a given correction in the speed of the conveyor may now be described, it being assumed that a disturbance has occurred as a result of which the conveyor is running too fast relative to feeder, former, and stacker, and articles of glassware pass the stacker to position G' and beyond at the time that they should be arriving at G.

Crank 17 now runs faster than the puffs occur so that at times T the crank assumes positions advanced clockwise of its Fig. 3 position. As this happens, shaft 29 is turned clockwise step-by-step because the clutch is engaged on more of the outstrokes of crank 17 and on less of the instrokes thereof, and the conveyor is gradually slowed down. The clockwise advances of crank 17 at times T now diminish and finally cease, as the speed of the conveyor is slowed down to the correct speed.

But at this time, the crank is in its most advanced position clockwise of its initial position at time T, and the puffs are still occurring on more of the outstrokes and on less of the instrokes. In other words, the device 11 is unstabilized. Consequently additional retarding adjustments are effected step-by-step, causing a certain amount of overcorrection. This has the effect of causing the positions of crank 17 at times T to retreat counter-clockwise and to approach the initial position thereof. Such approach is in increasing amounts because the slowing down of the conveyor is increasing.

But in the meantime, disc 27 has gradually been turned clockwise (Fig. 3), shifting slot 26 to the maximum extent for the particular disturbance which has occurred.

This reduces the total amount of overcorrection because the crank assumes a new innermost dead center position at time T, displaced clockwise of the original dead center position by virtue of slot 26 having been shifted, and moreover this new dead center position is reached earlier than would be the case if disc 27 should be held stationary at all times. Having reached this new dead center position, no further retarding corrections occur, this being clear from the preceding description of operation of the device 11 when the speed of the conveyor is correct and the device is stabilized.

However, the speed of the conveyor now is too slow because of the overcorrection which has been effected. Therefore, the positions of crank 17 at times T begin to fall short of the new dead center position and the clutch is engaged on more of the instrokes and less of the outstrokes, causing step-by-step adjustments of shaft 29 in counterclockwise direction to increase the speed of the conveyor to the amount of the overcorrection. As such adjustments occur, the counterclockwise advances of crank 17 diminish and finally cease when the speed of the conveyor again is correct. But now the position of crank 17 has been shifted counterclockwise to the maximum extent for the initial disturbance and therefore the clutch still is being engaged on more of the instrokes and less of the outstrokes, causing additional adjustments to increase the speed of the conveyor, the sum of which constitutes another overcorrection.

But as before, disc 27 and of course slot 26 gradually have been turned, this time counter-clockwise, causing an early cessation of such overcorrection due to the earlier attainment of innermost dead center position of crank 17 at time T. Thus still another dead center position is established located counterclockwise of the first new dead center position, but clockwise of the initial position shown in Fig. 3.

The conveyor now being caused to run too fast, retarding adjustments again are made and so on, until not only the speed of the conveyor is correct but such speed is maintained constant, so long as no further disturbance occurs, by the attainment of stability of device 11, so that articles of glassware successively arrive at G in regular time intervals.

From the foregoing, it will be understood that disc 27 (Fig. 3) in effect follows the shifting of the positions of crank 17 clockwise, if the conveyor runs too fast, and counterclockwise if the conveyor runs too slow, damping respectively the retarding adjustments and the accelerating adjustments. If the conveyor finally is adjusted to run slower than before, slot 26 of disc 27 and hence the innermost dead center position of crank 17 finally are located clockwise of their original positions at time T, and vice versa, if faster than before, when the speed of the conveyor again is correct. The device 11 is stabilized or operating in phase with feeder, former, and stacker because of such change in dead center position.

On the contrary, if disc 27 should be held stationary, the device 11 never would be stabilized, but would hunt, the positions of crank 17 constantly shifting first one way then the other through an angle twice the angle the crank would move through in causing the first overcorrection.

It will be understood that various changes may be made in the details of construction and the mode of operation of the above described embodiment of the invention without departing from the scope of the appended claims.

Thus, the number of complete revolutions of crank 17 between the time at which an article is deposited on the conveyor and removed by the stacker may be varied, as by changing the size of sprocket 13 to vary the spacings between the articles on the conveyor, and the period in which each article remains on the conveyor. This also permits the conveyor to be driven at any selected speed relative to the speed of the feeder, but in timed relation therewith.

Also the number of puffs for engaging the clutch, relative to the time at which an article is deposited upon or removed from the conveyor, and/or the number of times crank 17 makes a complete revolution likewise may be changed.

The direction in which sprocket 13 is driven may be reversed and the puffs timed to occur when crank 17 is in its outermost dead center position and the device 11 thus stabilized, at the time the speed of the conveyor is correct.

Having thus described my invention, what I desire to claim and secure by Leters Patent is:

1. In combination with a machine and apparatus to be operated in time relation therewith, means for causing the speed of the apparatus to correspond to the speed of the machine, comprising automatic means responsive to a change in relative speeds of the machine and apparatus to adjust the speed of the apparatus in increments the cumulation of which tends to over-correct said change in relative speeds, and automatic means operating upon each increment of adjustment of the apparatus for reducing the overcorrections of the adjusting means.

2. In combination with a machine and apparatus to be operated in time relation therewith, means for regulating the operation of the apparatus in accordance with that of the machine comprising means driven in synchronism with the apparatus for adjusting the speed of operation thereof, means timed by the machine for intermittently rendering the last named means operable to adjust the speed of the apparatus in increments the cumulation of which tends to effect over-corrections in the speed of said apparatus, and automatic means operated in synchronism with the last-named means operating upon each increment of adjustment of the apparatus for reducing the over-corrections effected by the second-named means.

3. In combination with a machine and apparatus to be driven at a desired speed relative thereto, a device operable to restore the desired speed relation between the machine and apparatus upon a change in the speed of either of them, said device normally operating in time relation to said machine, said device comprising driven means for adjusting the speed of said apparatus, means operating in synchronism with said machine for periodically rendering the driven means operable upon such a change in speed, to adjust the speed of the apparatus in increments until the desired relative speeds of the machine and apparatus are restored, such adjustments tending to destroy the time relation between the operations of said machine and said device, and automatic means for restoring the operation of said device in time relation with said machine upon a change in the relative speeds of the machine and apparatus.

4. In combination with a machine and apparatus to be driven in time relation therewith, a variable speed drive for the apparatus, and mechanism for controlling the setting of said drive comprising means driven continuously by said apparatus for adjusting said drive, means timed with said machine for periodically rendering the driven means operable to adjust the drive in increments, and means operated in response to the operation of the last-named means to reduce in relation to the number of such adjustments, the number of ensuing adjustments of the drive to be made by said last-named means in proportion to the total amount of such first-named adjustments.

5. In combination with a machine and apparatus to be operated in a desired time relation therewith, means for normally driving the apparatus so as to maintain such time relation, and automatic means for restoring such relation upon a disturbance thereof comprising speed adjusting means associated with the driving means, means driven continuously by the apparatus normally in time relation with the machine, means timed by the machine adapted to intermittently connect the driven means with the speed adjusting means to adjust the latter in increments as a result of such disturbance, whereby the desired speed relation between the apparatus and machine is restored, and automatic means for restoring the time relation between the driven means and the machine after such disturbance.

6. In combination with a machine and apparatus to be operated in time relation therewith, a drive for the apparatus including adjustable means for varying the speed of the apparatus, and automatic mechanism for restoring such time relation upon a disturbance thereof comprising means driven continuously in one direction by said apparatus, oscillatable means connected to the continuously driven means, an oscillatable shaft connected to the speed varying means, a clutch for operatively connecting the oscillatable means and the shaft, means for periodically engaging said clutch whereby the oscillatable means adjusts the shaft in one direction when the apparatus runs too fast and in the opposite direction when the apparatus runs too slow relative to the machine, and means operated by said shaft to reduce the amount of such adjustment which would be necessary without such means to restore the desired time relation between said machine and said apparatus.

DONALD G. MERRILL.